(12) United States Patent
Hildorsson et al.

(10) Patent No.: US 9,305,110 B2
(45) Date of Patent: Apr. 5, 2016

(54) METHOD AND ARRANGEMENT FOR SUPPORTING ANALYSIS OF SOCIAL NETWORKS IN A COMMUNICATION NETWORK

(75) Inventors: Fredrik Hildorsson, Kista (SE); Tor Kvernvik, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1018 days.

(21) Appl. No.: 13/498,230

(22) PCT Filed: Sep. 28, 2009

(86) PCT No.: PCT/SE2009/051074
§ 371 (c)(1),
(2), (4) Date: Mar. 26, 2012

(87) PCT Pub. No.: WO2011/037505
PCT Pub. Date: Mar. 31, 2011

(65) Prior Publication Data
US 2012/0185540 A1    Jul. 19, 2012

(51) Int. Cl.
*G06F 15/16*    (2006.01)
*G06F 17/30*    (2006.01)
*H04W 8/18*    (2009.01)
*H04W 4/02*    (2009.01)
*H04W 4/20*    (2009.01)
*H04W 64/00*    (2009.01)

(52) U.S. Cl.
CPC .......... *G06F 17/30958* (2013.01); *H04W 4/02* (2013.01); *H04W 4/206* (2013.01); *H04W 8/186* (2013.01); *H04W 64/00* (2013.01)

(58) Field of Classification Search
CPC ........................ H04L 12/1485; H04M 15/00

USPC .......................................................... 709/204
See application file for complete search history.

(56) References Cited

U.S. PATENT DOCUMENTS

2002/0191584 A1* 12/2002 Korus et al. .................. 370/349
2004/0193488 A1*  9/2004 Khoo et al. ..................... 705/14
(Continued)

FOREIGN PATENT DOCUMENTS

CN      101272398 A     9/2008
JP      2006246090 A    9/2006
WO      2009112072 A1   9/2009

OTHER PUBLICATIONS

Pandit, V. et al., "Extracting Dense Communities from Telecom Call Graphs", 3rd International Conference on Communication Systems Software and Middleware and Workshops, Jan. 6, 2008, pp. 82-89, IEE, Piscataway, N J.*

(Continued)

*Primary Examiner* — Brian J Gillis
*Assistant Examiner* — Juan C Turriate Gastulo
(74) *Attorney, Agent, or Firm* — Coats & Bennett, P.L.L.C.

(57) ABSTRACT

A method and apparatus for supporting social network analysis of terminal users in a communication network. Users being located relatively close to each other when making calls are more likely to be socially "connected" than users having mutually more remote locations. A partitioning unit (100) determines a representative geographical location for individual users based on traffic data and location data (102,104). User partitions are then made based on the users' representative geographical locations such that one particular user partition contains users having representative geographical locations within a limited geographical area. The user partition is then provided to a social network analysis function (106) for further analysis (108).

27 Claims, 3 Drawing Sheets

(56) References Cited

U.S. PATENT DOCUMENTS

| | | | |
|---|---|---|---|
| 2006/0293025 A1* | 12/2006 | Chiou et al. | 455/405 |
| 2007/0281689 A1 | 12/2007 | Altman et al. | |
| 2009/0129371 A1* | 5/2009 | Bishay | 370/352 |

OTHER PUBLICATIONS

Teng, W. et al., "Mining Communities of Acquainted Mobile Users on Call Detail Records", SAC, Mar. 11, 2007, pp. 957-958, ACM, South Korea.

Pandit, V. et al., "Extracting Dense Communities from Telecom Call Graphs", 3rd International Conference on Communication Systems Software and Middleware and Workshops, Jan. 6, 2008, pp. 82-89, IEE, Piscataway, NJ, US.

Eagle, N. et al. "Inferring Friendship Network Structure by Using Mobile Phone Data." Edited by Susan Hanson, Clark University, Worcester, MA, Proceedings of the National Academy of Sciences, Sep. 8, 2009, pp. 15274-15278, vol. 106, No. 36.

IBM, "Approach and System to Enable Large Scale Social Analysis." IP.com No. IPCOM000184998D, Jul. 7, 2009 [retrieved on Jun. 2, 2010]. Retrieved from the Internet: <URL: http://priorartdatabase.com/IPCOM/000184998>.

* cited by examiner

METHOD AND ARRANGEMENT FOR SUPPORTING ANALYSIS OF SOCIAL NETWORKS IN A COMMUNICATION NETWORK

TECHNICAL FIELD

The invention relates generally to a method and arrangement for supporting analysis of social relationships between terminal users in a communication network.

BACKGROUND

In the field of telecommunication, solutions have been devised for providing relevant and potentially attractive services that have been adapted to different service consumers according to their interests and needs in different situations. These services can thus be customised for individual users depending on their user profiles and/or current situation. Some examples are advertising and personalised TV. Solutions have also been suggested for identifying groups or "clusters" of users belonging to different social networks, and for adapting various services to these user groups.

Differentiated adaptation of services for user groups in a communication network may be accomplished based on knowledge of social relationships between terminal users. This kind of information may be extracted from traffic data available in communication networks, i.e. information on executed calls and other sessions, using various methods and algorithms for social network analysis which have been developed recently. Further, it may be of interest for some parties to gain knowledge of various statistics and aspects related to social networks. Some examples of such known analysis techniques are "centrality methods", i.e. finding the most central user in a social network, and "clique analysis", i.e. finding a group of users which are closely related to each other in some respect. Any such methods and algorithms for analysing social networks are often generally referred to as "SNA (Social Network Analysis) algorithms", which term will be used here as well.

Great amounts of traffic data are generally available from Charging Data Records (CDR) which are commonly generated and stored for the networks to support charging for executed calls and sessions. The traffic data may refer to voice calls, SMS (Short Message Service), MMS (Multimedia Message Service), game sessions and e-mails. In this description, the term "calls" is used for short to represent any type of communication between two parties, thus without limitation to voice calls. The traffic data may also contain further information on the calls related to the time of day, call duration, location and type of service used. Traffic data can also be obtained by means of various traffic analysing devices, such as Deep Packet Inspection (DPI) analysers and other traffic detecting devices, which can be installed at various communication nodes in the network.

This traffic data can thus be used to derive information on the social relations between different users, depending on the amount and type of communications these users have conducted with each other as well as time of day, duration and location when making their calls and sessions. Great efforts have been made to provide a mechanism for automatically identifying different groups or sets of users which are regarded as socially related, based on available traffic data. It has been generally recognised that a history of executed calls and sessions between different users can provide a basis for such social network analysis, basically assuming that two users having executed one or more calls can be regarded as socially related. Different criteria for calls may be defined for determining whether two users are deemed socially related, e.g. only calls exceeding 30 seconds to eliminate wrongly dialled numbers, only calls in both directions between two persons to eliminate support centres or the like, a minimum call frequency, and so forth.

However, many communication networks of today are quite extensive serving huge amounts of subscribers, maybe millions, that are typically active in such a large communication network. There is also a rapid increase of users and traffic in these networks. Therefore, it is a very complex and time-consuming process to detect and analyse millions of calls and sessions in order to identify different groups or sets of socially related users based on their previously executed communications.

For example, it may take several hours, days or even weeks for a processor system to execute SNA algorithms on a vast source of information on executed calls and sessions, such as traffic data, to identify a group of socially related users. This work also requires extensive memory resources for storing huge amounts of data. It is thus a problem that social network analysis of users in a communication network can be very complex and requires substantial storing, processor and computing resources, and that it also takes much time.

SUMMARY

It is an object of the invention to address at least some of the issues outlined above. It is thus an object to facilitate the process of analysing social relationships between terminal users in a communication network. These objects and others can be achieved primarily by a solution according to the appended independent claims.

According to different aspects, a method, an arrangement and a computer readable medium are defined for supporting analysis of social relationships between terminal users in a communication network by means of a partitioning unit.

In the inventive method, traffic data and location data related to calls made by the users are obtained, e.g. from CDR data available in the network. A representative geographical location is then determined for individual users based on the traffic data and location data. Next, a user partition is formed that defines a group of users based on the determined locations, where the users have representative geographical locations within a predetermined area. The formed user partition is then finally provided or delivered to a social network analysis function for further analysis work. In another aspect, a computer readable medium is defined containing instructions which, when executed on a processor in a partitioning unit, performs the method above.

According to the inventive arrangement, the partitioning unit comprises a data obtaining unit adapted to obtain traffic data and location data related to calls made by the users, and a location determining unit adapted to determine a representative geographical location for individual users based on the traffic data and location data. The partitioning unit further comprises a partition forming unit adapted to form a user partition that defines a group of users based on the determined locations where the users have representative geographical locations within a predetermined area, and a delivering unit adapted to provide the user partition to a social network analysis function.

The invented method, arrangement and computer readable medium may be implemented according to any of the following optional embodiments.

In one embodiment, the user partition is represented as a division on a graph comprising the users. Further, the predetermined area of the user partition may coincide with a densely populated geographical district or region.

In another embodiment, a plurality of location based user partitions are formed defining different groups of users having representative geographical locations within different limited areas. In that case, the user partitions may be formed according to a predefined network partition plan of corresponding predetermined areas, which is used to map each user's representative location to a user partition. The network partition plan may further be adjusted based on feedback from the subsequent analysis work using the formed user partitions. Alternatively, the user partitions can be formed for clusters of users found to be in relatively close proximity to each other according to their representative locations, and where a relatively small amount of calls have been made across different user partitions. The location based user partitions may also be adjusted such that the amount of executed calls implying social connections or ties across different user partitions, is reduced.

In further embodiments, the traffic data and location data can be obtained from CDR:s. Location data may be further extracted from information on the geographical location of cells, service and location areas in the case of a mobile network, or of connection points in which portable terminals can be plugged in the case of a fixed network. The representative geographical location basically implies a location where a user mostly makes his/her calls.

Using the inventive method and arrangement above will enable network operators to provide useful and accurate information on social relationships between terminal users more efficiently in terms of total processing time and scalability as well as storing capacity, when performing social network analysis of large communication networks.

Further possible features and benefits of the invention will become apparent from the detailed description below.

BRIEF DESCRIPTION OF THE DRAWINGS

The invention will now be described in more detail by means of exemplary embodiments and with reference to the accompanying drawings, in which.

DETAILED DESCRIPTION

Figure 1:
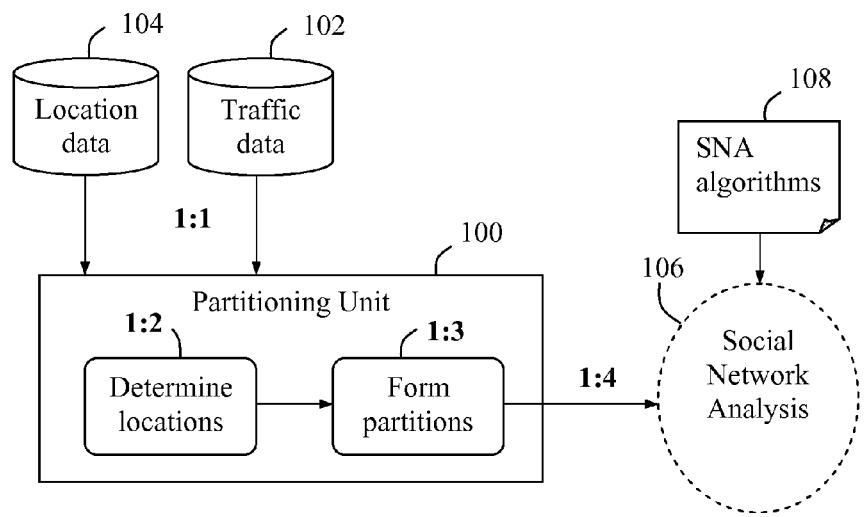
FIG. 1 is a schematic block diagram illustrating an example of how a social network analysis can be supported, according to one embodiment.

In this description, the term "user partition" is used to represent the division of a plurality of terminal users which are deemed to be socially related in a predefined respect. Briefly described, the invention may be used to facilitate the analysis work of defining user partitions and identifying terminal users which are qualified to belong to a certain partition, in this description referred to as the process of partitioning. When a user partition has been formed, it is possible to execute SNA algorithms for the users within that partition.

Further, various communication services and other services may be adapted to the users in the partition based on the knowledge that these users are deemed socially related, at least to some extent. It may also be possible to utilise such knowledge on social networks for planning and configuration of the communication network or other community infrastructures.

It has been previously recognised that in a common traffic pattern, a majority of calls are made between terminal users when located relatively close to one another, i.e. within a limited geographical area, while calls between remotely located users are generally less frequent. In this invention, it is further noted that there is a strong correlation between the mutual distance or proximity of representative geographical locations for individual users and the strength of their social relations. As a result, users typically being located relatively close to each other when calling are more likely to be socially "connected" than users having mutually more remote locations. In fact, an approximation can be done where the probability that two individuals are socially connected is inversely proportional to the square of their relative distance.

This conclusion is now utilised for making user partitions based on the users' geographical locations when calling each other such that one particular partition contains users with representative geographical locations within a predetermined limited area. In this description, the term "representative geographical location" implies a location where a user mostly makes his/her calls. A graph of location-based user partitions may also be created, and these user partitions may be further adjusted in order to minimise the amount of social connections, or "ties", across different user partitions.

The users in these location-based user partitions can thus be analysed in terms of social networks, using SNA algorithms or the like, which is however outside the scope of this solution. This further analysis work is thus facilitated when the inventive location-based user partitions have been made, which is a relatively simple way of grouping users together with a high probability of being socially connected. Further, when a great number of users have been divided into a plurality of user partitions in this way, the SNA algorithms can be executed on each partition in parallel with significantly reduced amount of users. As a result, the execution time, complexity and storage requirements can all be reduced and the efficiency can thus be generally improved for any subsequent analysis work within each user partition.

It is also possible to use the above-described location-based partitioning as a "pre-partition" for further partitioning work, e.g. using various partitioning algorithms. In fact, some partitioning algorithms are only effective if some pre-partitioning has been made, and using the inventive location-based partitioning will make the partitioning algorithms the more effective and the processing time can be reduced by several hours for large communication networks.

The representative geographical location of a user may be determined from available traffic data, such as CDR data, although other methods are also possible to use such as positioning functions for mobile users that may be employed anyway in the network. Further knowledge on the location of different cells, service and location areas of a mobile network, or connection points of a fixed network in which portable terminals can be plugged, etc., may be needed to establish the location of a user when making a call, depending on what type of network is used. For example, such portable terminals may be used in fixed networks for services such as e-mail, chatting and Skype. A mobile terminal may further send GPS coordinates which can be used to determine his/her position.

FIG. 1 illustrates how location-based user partitions with terminal users potentially being socially related, can be formed for a communication network by means of a partitioning unit 100, according to an exemplary embodiment. Initially, it is assumed that no partitions have been made and that traffic data is available for calls or communications made in the network, which may be a huge amount of data in an extensive network.

In a first schematic action 1:1, the partitioning unit 100 obtains traffic data of executed calls and location data of the network from a traffic data source 102 and a location data source 104, respectively. The traffic data source 102 may include a CDR database and/or a traffic sensing function which can register executed calls in the network and provide useful information on those calls, e.g. by means of various traffic analysing devices such as Deep Packet Inspection (DPI) analysers or similar installed at various communication nodes in the network.

The location data source 104 may be a database or the like holding information on the geographical location of different nodes of the network used when making the calls, e.g. connection points in which portable terminals can be plugged in the case of a fixed network, or cells, service and location areas in the case of a mobile network. Other location data sources may also be used, such as the operator's subscription data base holding billing address information of subscribers.

From the obtained traffic and location data, the partitioning unit 100 then determines a representative geographical location for individual users in the network, as indicated in a further action 1:2. As mentioned above, the representative geographical location of a user is the location where the user mostly makes his/her calls, which can be derived from the traffic and location data of individual calls as described above. For example, the user's location may first be determined with a suitable accuracy for each call, and the most frequent location may then be selected as the most representative location of that user.

This procedure is conducted for any number of users in the network, e.g. for practically all users having made a sufficient number of calls to provide a meaningful representative geographical location. A certain filtration, or "cleaning", of data may also be made before this step, e.g. disregarding calls to non-personal communication nodes such as automated phone services, calls to support numbers and telemarketing activities.

Within the scope of step 1:2, and depending on the type of network and its configuration, the partitioning unit 100 may derive the users' geographical locations for each call from the traffic data, e.g. received as CDR data, such that further location data from a separate location data source 104 may not be necessary. Thus, although the traffic data source 102 the location data source 104 are illustrated as two separate entities, they may in practice be realised as a single CDR database.

Depending on the operator-specific configuration of the CDR:s, different amounts of geographical information can be extracted therefrom. For example, a CDR of a mobile network typically includes a "Cell Global Identity" or "Service Area Identity" referred to as CGI/SAI, containing a globally unique identity of the cell used for the call. From the CGI/SAI, it is also possible to derive location information on a higher level, e.g., location area, BSC (Base Station Controller) service area or MSC (Mobile Switching Centre) service area.

As indicated in a further action 1:3 in the partitioning unit 100, user partitions that define groups of terminal users with similar representative geographical locations, are then formed based on the users' locations determined according to the above. In this example, a plurality of such location-based user partitions are thus formed defining different groups of users having representative geographical locations within different limited areas. In this step, a predefined network partition plan may be used which outlines different geographic areas for the user partitions. When representative geographical locations have been determined for the terminal users, the network partition plan can thus be used to map their representative locations to a user partition, thereby identifying which users belong to each partition. In practice, this partition plan may have been created by a network planning expert or generated automatically.

When creating the network partition plan, the number of user partitions therein is thus decided and what geographical regions they should cover. For example, if the users' representative locations are derived from their CDR:s, the partition plan may state which BSC service area, MSC service area or even individual cells to be contained in each user partition. Optionally, the network partition plan may also be adjusted based on feedback from the subsequent analysis work using the formed user partitions.

It is also possible to employ other partitioning strategies without relying on a predefined network partition plan. For example, a user partition may be formed when a cluster of users are found to be in relatively close proximity to each other according to their determined representative locations, and where a relatively small amount of calls have been made across different user partitions. On the other hand, there may be many calls occurring across two particular dense areas in which case a partition may be formed covering both these areas.

In some practical cases, it may not be necessary to determine the user's exact location at the time of each call. It may be sufficient to determine a typical location of the user over a certain time, e.g. one month, as the representative geographical location. For example, if a large number of CDR:s is available for a user in a mobile network, the most frequently occurring CGI/SAI of the CDR:s during the month may be selected as the representative location. In this context, a cell identity may be too detailed location information. It may be better to form the user partition based on an RNC/BSC (Base Station Controller) service area, or even the MSC service area, depending on the network planning of the total area to be covered. For example, if each BSC service area corresponds to a densely populated geographical district or region such as a city, it may be suitable to form user partitions based on which BSC service area the users' representative location belongs to.

In a final shown action 1:4 in the partitioning unit 100, the user partitions formed in action 1:3 are provided or delivered to a social network analysis function 106 or the like for executing various SNA algorithms 108 in order to obtain useful information and knowledge of the social networks of the terminal users in the analysed communication network. The operation of such a social network analysis function is however outside the scope of this solution.

Figure 2:
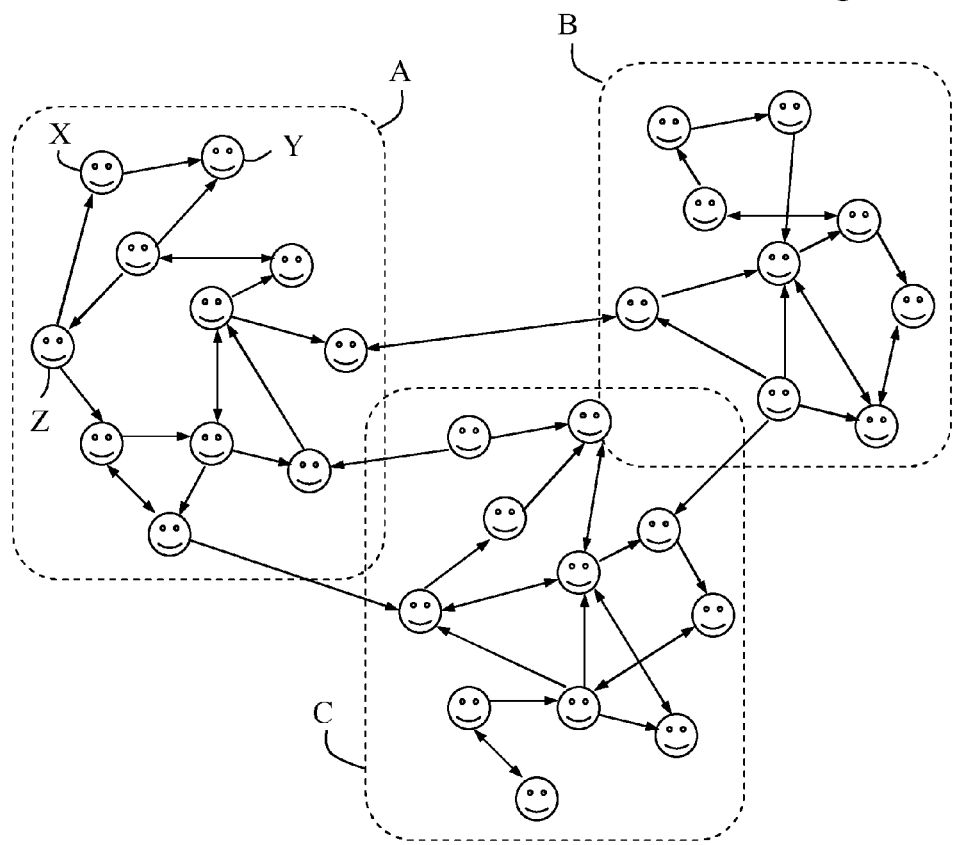
FIG. 2 is a schematic diagram illustrating an example of how partitions may be formed with terminal users in a communication network, when using the invention.

An example of how location-based user partitions may be formed with terminal users in a communication network, will now be described with reference to FIG. 2. It is assumed that representative geographical locations have been determined for the terminal users as described for action 1:2 above. FIG. 2 illustrates how the users' representative locations are distributed over a geographical area covered by the communication network. The various arrows between the users illustrate schematically that different calls have been made, which is information that can be obtained from traffic data such as CDR:s as described above. For example, user X has called user Y at least once and has been called at least once by user Z, as shown in the figure.

The user partitions may be represented as divisions on a graph with the users' representative locations, basically as shown in FIG. 2. It should be noted that this figure is greatly simplified and in reality the number of users and calls is of a much greater magnitude. The calls shown by the arrows thus imply probable social relations between the users.

In this example, three user partitions A, B and C with different users have been formed such that the number of potential relations across different user partitions is as few as possible. These user partitions A-C may be made from a predefined network partition plan with different geographic areas for the partitions, e.g. the areas of cities or other densely populated geographical districts or regions. The users are then mapped and assigned to the user partitions according to their representative locations and the partition plan.

Alternatively, the user partitions A-C may be formed for clusters of users found to be in relatively close proximity to each other according to their representative locations, as mentioned above. Using this approach, the user partitions A-C may be formed such that a relatively small amount of calls have been made across different user partitions, as apparent in the figure. This operation can also be referred to as "minimising the edge cut" of the partitioning.

Using the knowledge of correlation between the proximity of representative geographical locations for individual users and the strength of their social relations, this location-based division of the users in user partitions A-C thus indicates groups of users likely to be socially connected.

Figure 3:
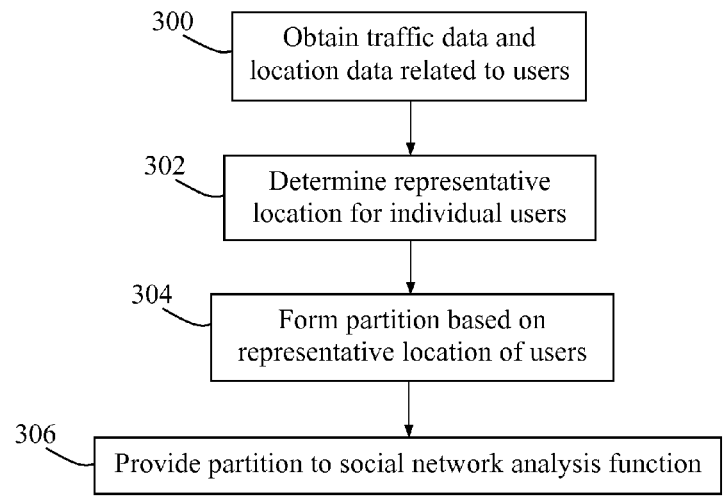
FIG. 3 is a flow chart illustrating a procedure for supporting social network analysis, according to another embodiment.

A procedure for supporting social network analysis of terminal users in a communication network, will now be described with reference to the flow chart FIG. 3. The shown steps are executed by a partitioning unit such as the unit 100 described above. Although this procedure describes that one user partition is formed, it can be repeated for further user partitions which may be represented as divisions on a graph or the like with plural location-based user partitions, e.g. basically in the manner shown in FIG. 2.

In a first step 300, the partitioning unit obtains traffic data and location data related to communications made by the users, basically corresponding to action 1:1 above. In a next step 302, a representative geographical location is determined for a plurality of individual users based on the obtained traffic data and location data, basically corresponding to action 1:2 above. A user partition that defines a group of users is then formed based on the determined locations, in a further step 304, where the users have representative geographical locations within a predetermined area. Finally, in a last step 306, the formed user partition is provided or delivered to a social network analysis function, basically corresponding to action 1:2 above. The social network analysis function is then able to execute various SNA algorithms on the users in the formed user partition involving a limited number of users which will reduce the complexity of the analysis work. As mentioned above, this process can be repeated to form a plurality of user partitions. Thereby, these SNA algorithms are executed on a significantly reduced amount of users within each partition, as compared to the total amount of users in the communication network.

Figure 4:
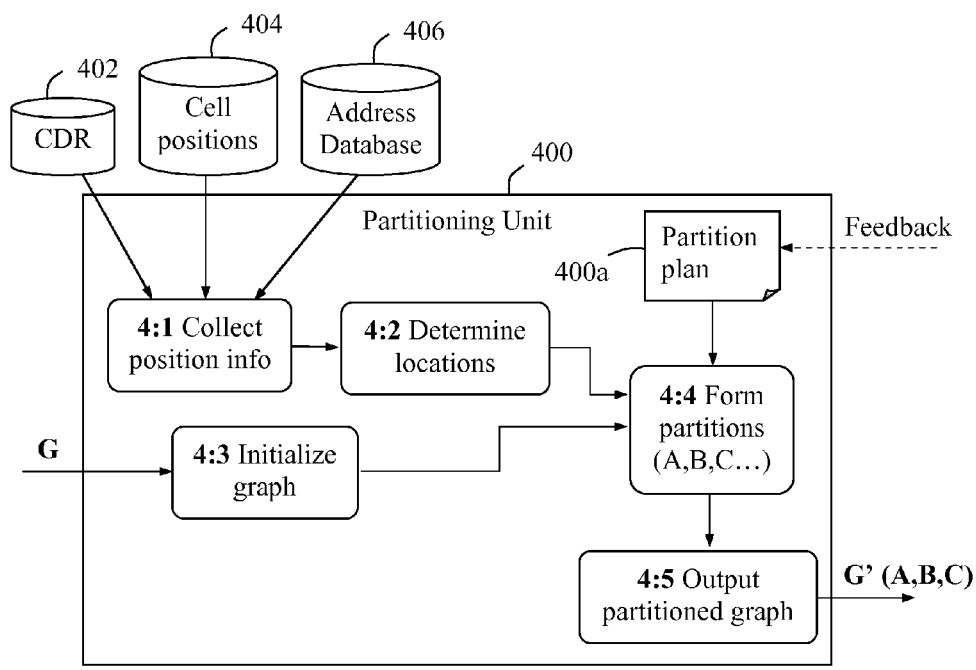
FIG. 4 is a schematic block diagram illustrating how a partitioning unit may operate in a practical example, according to further embodiments.

A practical example of how a partitioning unit may operate when supporting social network analysis of terminal users in a communication network according to this solution, will now be described with reference to FIG. 4. The partitioning unit 400 operates basically in the manner described for FIGS. 1 and 3 above, and the example of FIG. 4 outlines further possible features and details. The communication network is a cellular mobile network employing CDR:s and maintaining information on where individual cells are positioned geographically. As mentioned above, cell positions may be used as location information for the individual users' representative geographical locations in this context, although it may in some situations be sufficient and more suitable to use an RNC/BSC service area, or even an MSC service area, as location information for terminal users in a cellular network depending on the network planning of cells.

A first action 4:1 in the partitioning unit 400 illustrates that position information is collected from various data sources, in this case including traffic data from a CDR database 402, and location data from a cell position database 404 and/or a subscriber address database 406, although all of these data sources are not necessarily utilised. For example, it may be sufficient to identify a user of a call and which cell the user was located in when making the call, from a CDR for that call, and to determine that cell's geographical position from database 406. In another feasible example, a calling user may be identified from the CDR and that user's home address may be obtained from database 406 to be used as the user's representative geographical location.

In a next action 4:2, the user's representative geographical locations are determined from the information obtained in the preceding action 4:1. In a further action 4:3, a graph G is initialized on which user partitions A, B, C, . . . are to be presented as divisions, and this action may be executed at any time before the next action 4:4. When populated with terminal users, the graph G may be configured basically as shown in FIG. 2.

Thus, the partitioning unit 400 forms the user partitions A, B, C, . . . in the next action 4:4, based on the determined representative user locations and using the initialised graph G, in this example also using a predefined network partition plan 400a with different geographic areas for the user partitions. It is thus assumed that the partition plan 400a has been predefined in the partitioning unit 400, and it may outline the areas of cities or other densely populated geographical districts or regions as the user partitions A, B, C, . . . . The users are thus mapped and assigned to the user partitions A, B, C, . . . of the network partition plan according to their determined representative locations.

In this action, the previously initialized graph G is also populated with the users according to their partition assignment above, thus creating a populated graph G'. In a final action 4:5, the formed user partitions A, B, C, . . . are output as the populated graph G'(A, B, C, . . . ) to a social network analysis function or the like, not shown in this figure. Optionally, the network partition plan can be adjusted based on feedback from the subsequent analysis work when having used the formed user partitions A, B, C, . . . , as indicated by the dashed arrow.

A possible arrangement in a partitioning unit will now be described in more detail with reference to the block diagram in FIG. 5, which may be used in any of the above-described procedures and embodiments. The partitioning unit 500 is thus configured to support social network analysis of terminal users in a communication network, and comprises a data obtaining unit 500a adapted to obtain traffic data D and location data L related to calls made by the users. The traffic data D and location data L are obtained from suitable data sources not shown in this figure. The partitioning unit 500 also comprises a location determining unit 500b adapted to determine a representative geographical location for individual users based on the obtained traffic data and location data.

The partitioning unit 500 further comprises a partition forming unit 500c adapted to form a user partition that defines a group of users based on the determined locations where the users have representative geographical locations within a predetermined area. The partitioning unit 500 also comprises a delivering unit 500d adapted to provide the user partition to a social network analysis function.

Optionally, the different functional units in the partitioning unit 500 can be further configured according to the following examples. The partition forming unit 500c may be further adapted to represent the user partition as a division on a graph comprising the users. The partition forming unit 500c may be further adapted to form a plurality of location based user partitions defining different groups of users having representative geographical locations within different limited areas.

The partition forming unit 500c may be further adapted to form the user partitions according to a predefined network partition plan of corresponding predetermined areas, by using the partition plan to map each user's representative location to a user partition. The partition forming unit 500c may be further adapted to adjust the network partition plan based on feedback from the subsequent analysis work using the formed user partitions. The partition forming unit 500c may be further adapted to adjust the location based user partitions by minimising the amount of executed calls implying social connections or ties across different user partitions. If no predefined network partition plan is used, the partition forming unit 500c may be adapted to form the user partitions for clusters of users found to be in relatively close proximity to each other according to their representative locations, and where a relatively small amount of calls have been made across different user partitions.

The data obtaining unit 500a may be further adapted to obtain the traffic data and location data from CDR:s. The data obtaining unit 500a may be further adapted to extract location data from information on the geographical location of connection points in which portable terminals can be plugged in the case of a fixed network, or of cells, service and location areas in the case of a mobile network.

Figure 5:
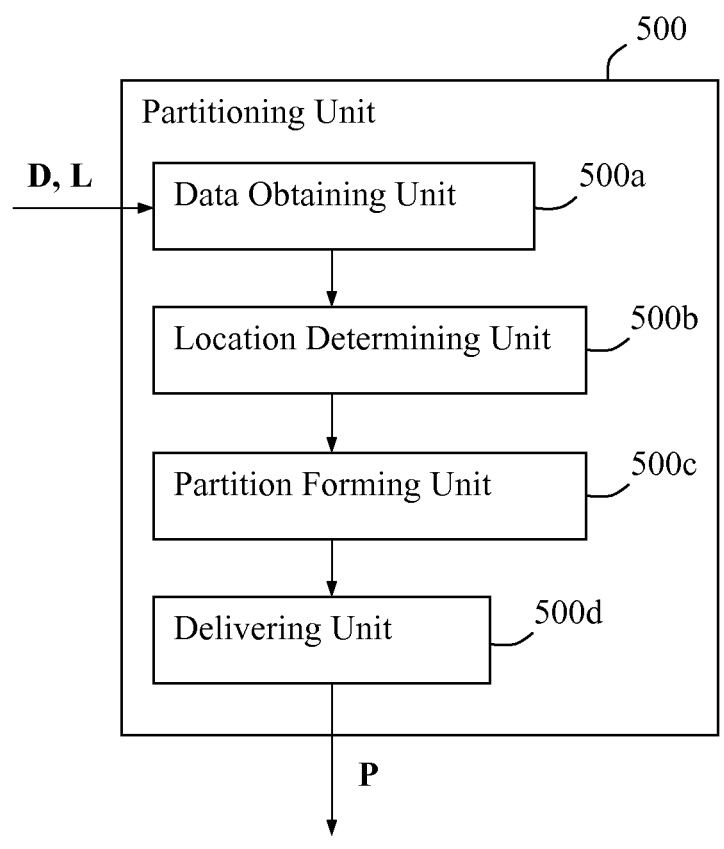
FIG. 5 is a schematic block diagram illustrating an arrangement in a partitioning unit in more detail, according to further embodiments.

It should be noted that FIG. 5 merely illustrates various functional units in the partitioning unit 500 in a logical sense, although the skilled person is free to implement these functions in practice using any suitable software and hardware means. Thus, the invention is generally not limited to the shown structure of the partitioning unit 500 while its functional units may be configured to operate according to the methods and procedures described above for FIGS. 1-4, where appropriate.

The invention may be implemented as a computer readable medium containing instructions which when executed on a processor in a partitioning unit performs the following steps, to support social network analysis of terminal users in a communication network: A first step of obtaining traffic data and location data related to calls made by the users, a next step of determining a representative geographical location for individual users based on the traffic data and location data, a next step of forming a user partition that defines a group of users based on the determined locations, where the users have representative geographical locations within a predetermined area, and a final step of providing the user partition to a social network analysis function.

By using the invention according to any of the above-described aspects and embodiments, the social analysis of users in a communication network can be supported and facilitated with reduced complexity and requiring less processor and computing resources. In particular, geographical information already available in traffic data such as the CDR:s, is utilised in the above-described manner, e.g. to provide a graph with user partitions comprising users which are likely to be socially connected. As a result, the social analysis may be carried out for each user partition separately in much shorter time, as compared to the previously known solutions. The above-described location-based partitioning procedure may be used to create a "pre-partitioning" to be used for further partitioning work, e.g. using various partitioning algorithms which is however outside the scope of this invention.

While the invention has been described with reference to specific exemplary embodiments, the description is generally only intended to illustrate the inventive concept and should not be taken as limiting the scope of the invention. The invention is defined by the appended claims.

The invention claimed is:

1. A method executed by a partitioning device for supporting social network analysis of terminal users in a communication network, comprising:
   obtaining, from data records available in the communication network, traffic data and location data related to calls made by said users during a period of time, wherein the traffic data and location data related to any calls made by a given user during the period of time indicate one or more locations at which that given user made those calls;
   determining a representative geographical location for individual ones of said users based on said traffic data and location data, wherein the representative geographical location of a user is a location representative of where the user more often than not makes his or her calls, as indicated by the traffic data and location data obtained for calls made by that given user during the period of time;
   forming a user partition that defines a group of said users having representative geographical locations within a predetermined area; and
   providing said user partition to a social network analysis function.

2. The method according to claim 1, wherein said user partition is represented as a division on a graph comprising said users.

3. The method according to claim 1, wherein said predetermined area coincides with a densely populated geographical district or region.

4. The method according to claim 1, wherein said forming further comprises forming a plurality of location-based user partitions that define different groups of said users having representative geographical locations within different limited areas.

5. The method according to claim 4, wherein said forming comprises forming the location-based user partitions according to a predefined network partition plan of corresponding predetermined areas, by using the network partition plan to map each user's representative geographical location to a location-based user partition.

6. The method according to claim 5, further comprising adjusting the network partition plan based on feedback from the social network analysis function regarding social network analysis done using the formed location-based user partitions.

7. The method according to claim 4, wherein said forming comprises forming said location-based user partitions to include clusters of users in relatively close proximity to each other according to their representative geographical locations, and to form said user partitions such that a relatively small number of calls have been made across different user partitions.

8. The method according to claim 4, further comprising adjusting said location-based user partitions to reduce the amount of calls executed across different user partitions, and thereby reduce the number of implied social connections or ties across different user partitions.

9. The method according to claim 1, wherein said obtaining comprises obtaining the traffic data and location data from charging data records.

10. The method according to claim 9, wherein said obtaining further comprises extracting location data from at least one of:
   information on the geographical location of cells;
   service and location areas in the case the communication network is a mobile network; and
   connection points at which portable terminals connect to the communication network in the case the communication network is a fixed network.

11. A partitioning device configured to support social network analysis of terminal users in a communication network, comprising a processor and a memory containing instructions executable by said processor whereby said device is operative to:
   obtain, from data records available in the communication network, traffic data and location data related to calls made by said users during a period of time, wherein the traffic data and location data related to any calls made by a given user during the period of time indicate one or more locations at which that given user made those calls;
   determine a representative geographical location for individual ones of said users based on said traffic data and location data, wherein the representative geographical location of a user is a location representative of where the user more often than not makes his or her calls, as indicated by the traffic data and location data obtained for calls made by that given user during the period of time;
   form a user partition that defines a group of users having representative geographical locations within a predetermined area; and
   provide said user partition to a social network analysis function.

12. The partitioning device according to claim 11, wherein the partitioning device is further configured to represent said user partition as a division on a graph comprising said users.

13. The partitioning device according to claim 11, wherein said predetermined area coincides with a densely populated geographical district or region.

14. The partitioning device according to claim 11, wherein the partitioning device is further configured to form a plurality of location-based user partitions defining different groups of users having representative geographical locations within different limited areas.

15. The partitioning device according to claim 14, wherein the partitioning device is further configured to form said user partitions according to a predefined network partition plan of corresponding predetermined areas, by using the partition plan to map each user's representative location to a location-based user partition.

16. The partitioning device according to claim 15, wherein the partitioning device is further configured to adjust the network partition plan based on feedback from the social network analysis function regarding social network analysis done using the formed location-based user partitions.

17. The partitioning device according to claim 15, wherein the partitioning device is further configured to adjust said location-based user partitions by minimizing the amount of calls executed across different user partitions, and thereby minimize the number of implied social connections or ties across different user partitions.

18. The partitioning device according to claim 14, wherein the partitioning device is further configured to form said user partitions to include clusters of users in relatively close proximity to each other according to their representative locations, and to form said user partitions such that a relatively small number of calls have been made across different user partitions.

19. The partitioning device according to claim 11, wherein the partitioning device is configured to obtain the traffic data and location data from charging data records.

20. The partitioning device according to claim 19, wherein the partitioning device is further configured to extract location data from at least one of:
   information on the geographical location of cells; service and location areas in the case the communication network is a mobile network; and
   connection points at which portable terminals connect to the communication network in the case the communication network is a fixed network.

21. method of claim 1, wherein the method further comprises:
   forming a plurality of user partitions, wherein each partition defines users that are likely to be socially connected; and
   providing the plurality of user partitions to a social network analysis function, wherein providing said user partitions to a social network analysis function assists the social network analysis function to analyze, for each partition, the actual existence and/or extent of social connections amongst users in the same partition.

22. The method of claim 1, wherein said determining comprises excluding, based on the obtained traffic data, calls from a set of calls with obtained location data, and determining a representative geographic location based on the location data of remaining calls in the set.

23. The method of claim 1, wherein traffic data comprises how frequently calls were made by a user with respect to a plurality of locations identified in the location data, and determining a representative geographical location for a user comprises determining based on the location that had the most frequent calls.

24. A method of facilitating analysis of social connections amongst a population of terminal users in a communication network, the method comprising:
   for each of the terminal users in said population, obtaining, from data records available in the communication network, data indicating locations that the user has previously been at when participating in communication sessions via the communication network during a period of time and determining, based on that data, a representative geographical location for the user which represents the user as more often than not being at that location when participating in communication sessions, as indicated by the data obtained for the user;
   partitioning said population of users into different partitions of users that are likely to be socially connected, by defining different partitions as including different groups of users having representative geographical locations within different limited areas; and
   assisting a social network analysis function to analyze, for each of said partitions, the actual existence and/or extent of social connections amongst users in that same partition, rather than analyzing the actual existence and/or extent of social connections amongst all users in said population as a whole, by sending information indicating each of said partitions to the social network analysis function.

25. The method according to claim 1, wherein the data records include charging data records, data records generated by one or more traffic analyzing devices in the communication network, data records generated by one or more positioning functions in the communication network for determining the position of users, or any combination thereof.

26. The partitioning device according to claim 11, wherein the data records include charging data records, data records generated by one or more traffic analyzing devices in the communication network, data records generated by one or more positioning functions in the communication network for determining the position of users, or any combination thereof.

27. The method according to claim 24, wherein the data records include charging data records, data records generated by one or more traffic analyzing devices in the communication network, data records generated by one or more positioning functions in the communication network for determining the position of users, or any combination thereof.

* * * * *